Aug. 10, 1954  A. M. BUSWELL ET AL  2,686,146
PROCESS OF TREATING CITRUS FRUIT WASTES
Filed April 14, 1951
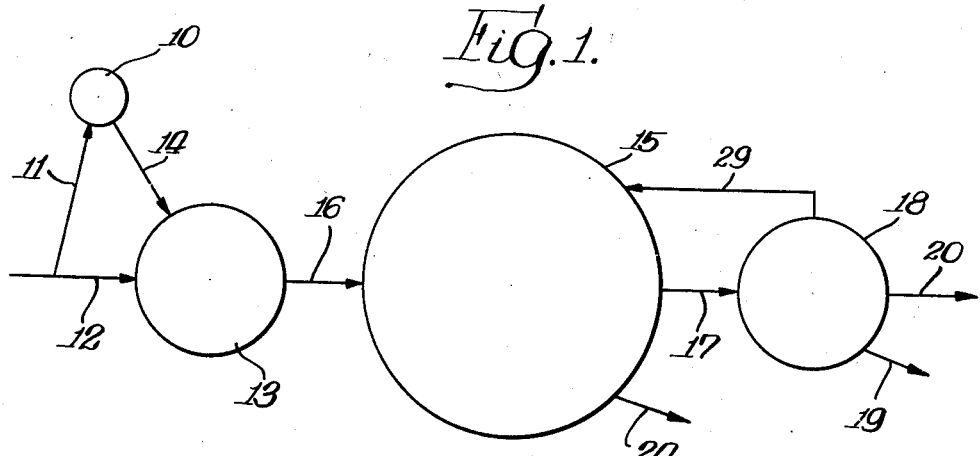
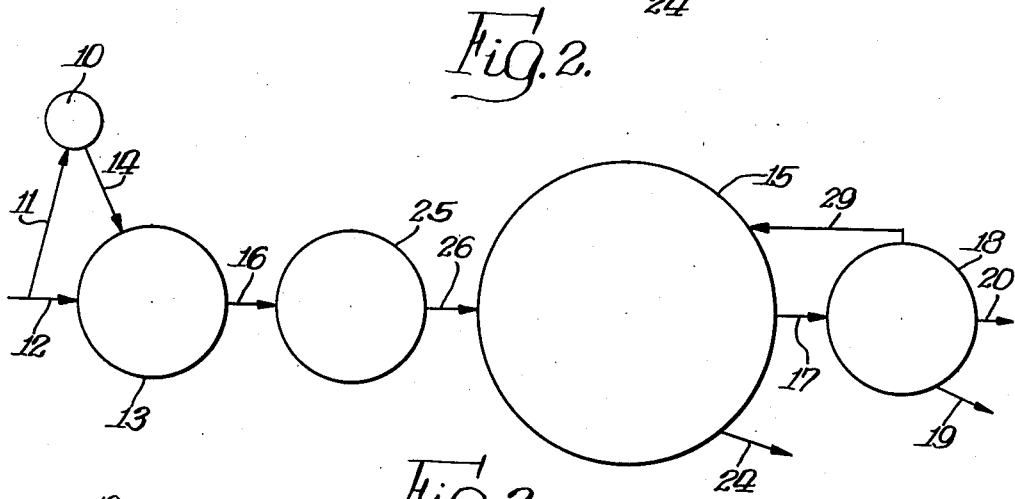
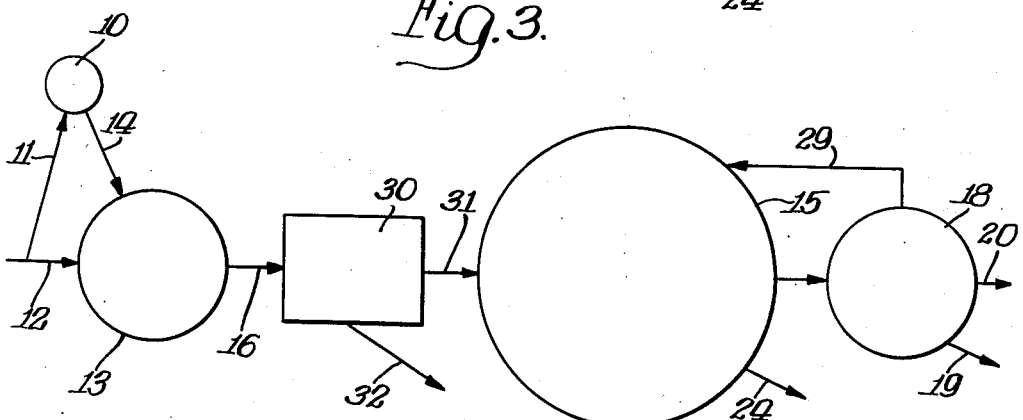
INVENTORS.
Arthur M. Buswell,
Clair S. Boruff.
By Fidler Crouse & Beardsley
Attys.

Patented Aug. 10, 1954

2,686,146

UNITED STATES PATENT OFFICE 2,686,146

PROCESS OF TREATING CITRUS FRUIT WASTES

Arthur M. Buswell, Urbana, and Clair S. Boruff, Peoria, Ill.

Application April 14, 1951, Serial No. 221,078

9 Claims. (Cl. 195—13)

This invention relates to a process and apparatus for treating organic wastes. More particularly the invention relates to a process and apparatus for stabilizing organic wastes containing sugars, with or without other organic material, to render such wastes suitable for disposal or for further treatment preparatory to disposal.

Waste liquors resulting from certain industrial processes contain sugar, and in certain cases additional organic materials, which make such wastes difficult to dispose of by previously known processes. For example, waste liquors resulting from the processing of citrus fruits contain waste materials such as juice, pulp, and in some cases, skins, as well as wash water and consequently have a relatively high sugar content. These waste liquors, being high in sugar content, are of a fermentable nature and cannot be disposed of without previous treatment to render them less offensive when discharged into streams or disposed of in other ways. Direct anaerobic fermentation of waste liquors containing substantial amounts of carbohydrates, and particularly where the carbohydrates are sugars, is difficult inasmuch as the carbohydrates have a tendency to decompose under anaerobic fermentation conditions, forming large amounts of acids consisting principally of acetic, propionic, butyric and lactic acids, with smaller amounts of various other acids. When such acids accumulate they inhibit methane formation. Moreover, this acid formation is characterized by the evolution of $H_2$ and $CO_2$ with very little methane.

An object of the present invention is to provide a process for treating waste liquors containing sugars to render them relatively inoffensive when discharged into drainage channels or disposed of in other ways.

Another object is to provide a process for stabilizing organic waste liquors containing sugars, such as citrus fruit wastes, whereby the organic material is largely converted to methane and carbon dioxide, leaving a small amount of organic material in the liquor for final discharge or subsequent treatment.

Still another object of the invention is the provision of a process for effecting relatively rapid treatment of waste liquors containing sugars in a relatively simple and inexpensive manner to render them suitable for discharge into drainage channels or for other known further treatment prior to disposal.

A further object is to provide a process for treating waste liquors containing sugars whereby not only are the waste liquors prepared for disposal but valuable feed components produced therefrom.

Still another object is the provision of apparatus for accomplishing any and all of the foregoing objects, among others, which will hereinafter appear.

Other objects and advantages of the invention will appear from the following description taken in connection with the appended drawings, wherein:

Figure 1 is a flow diagram showing one system suitable for carrying out the present invention;

Fig. 2 is a flow diagram showing a modified form of system for carrying out the present invention; and Fig. 3 is a flow diagram showing a further modification.

For convenience in explanation of the invention, the process in accordance with the invention is described in connection with the flow diagrams shown in the drawings and representing suitable systems for carrying out the process. However, it will be understood that the invention is not limited to the several embodiments of the systems shown but may be practiced with other suitable forms of apparatus capable of carrying out the process in accordance with the principles herein set forth.

The present invention is applicable to various organic wastes containing sugars, with or without other organic material. In most cases such waste is essentially liquid but where it is not, sufficient water or other suitable liquid is added to provide an essentially liquid material for treatment. Where solids are present in the waste and are not of sufficiently small size to permit sufficiently rapid fermentation and digestion they may be ground to the desired size.

Where the waste is produced in the course of processing citrus fruits, as for example in expressing juice for concentration or canning, such waste is essentially liquid and includes juice, pulp, wash water, and in some cases also fruit skins. It will be understood, of course, that where the waste includes fruit skins the latter may be previously ground in order to render them more readily subject to the action of the organisms subsequently employed in the process in accordance with the invention.

In accordance with the present invention, the waste liquor to be treated is subjected to a preliminary fermentation by a suitable yeast strain capable of converting the sugars in the waste to alcohol. The yeast which is employed is one which is capable of effecting the desired fermentation under anaerobic conditions. Such yeast is known to be characterized by a large cell growth rather than production of alcohol under anaerobic conditions. One strain of yeast which we have found to give excellent results is *Saccharomyces ellipsoideus*, American type culture collection No. 2338. Other yeasts and yeast-like fungi having the desired characteristics as just above stated may be used in lieu of the particular culture just mentioned. Such other yeasts include A. T. C. C. No. 4125, molasses type yeast of unknown origin; A. T. C. C. No. 6038, baker's type yeast of unknown origin; A. T. C. C. No. 2478, *Saccharomyces pombe*; and N. R. R. L. (Northern Regional Research Laboratories) No. 379, *Saccharomyces Carlsbergensis*.

Prior to the preliminary fermentation of the waste liquor with the yeast, the yeast is acclimated to the particular environment of the waste liquor to be treated and is strengthened so as to provide an active and vigorous culture. To this end, a minor portion of the waste liquor, preferably approximately 3% by volume, is segregated from the main flow of waste liquor and is passed to a yeast culture zone. Such yeast culture zone may be conveniently provided by a tank 10 (Fig. 1) connected by suitable means, as for example a pipe 11, to a pipe 12 carrying the remainder of the waste liquor to be treated.

The acidity of the material in the yeast culture tank 10 is adjusted to approximately pH 4 by the addition of a suitable quantity of appropriate material such, for example, as ammonium carbonate. Alternatively the pH may be adjusted by supplying to the yeast culture zone material from the yeast growth zone hereinafter described. If the pH should be very low, that is, approximately 2 to 3, then it is desirable to partially neutralize the waste with soda ash to a pH of between approximately 3.5 and approximately 4, followed by the addition of ammonium carbonate.

In initiating the process the material in the yeast culture tank 10 is inoculated with an active culture of the selected strain of yeast and is allowed to grow therein. Of course, after the process has been established, sufficient yeast will be present in the yeast culture tank 10 so that under ordinary circumstances it will not be necessary to add additional yeast culture. The yeast cell count is started and maintained at a level of between approximately 100 million and approximately 200 million per cc. by regulating the rate of flow, pH and nitrogen content.

The yeast in the culture tank 10 is supplied with a sufficient quantity of nitrogenous food, and other necessary nutrients where not available in the waste liquor, to insure vigorous growth of the yeast to thereby produce an active and vigorous culture in the culture tank 10. The nitrogen may be supplied by the addition of ammonium carbonate, urea or ammonia to the culture tank.

The yeast in the yeast culture tank is cultivated either anaerobically or aerobically as found best suited to the waste. Normally, anaerobic production of the yeast is preferred. However, if growth of the yeast culture tank and in the yeast growth tank (hereinafter described) is slow, due to the character of the waste, then the yeast count in the yeast culture tank may be increased by aeration.

At this point it should be noted that while the process may be carried out intermittently it ordinarily will be found preferable to carry it out in a continuous manner, the various tanks and pipes herein referred to being selected of suitable relative sizes to provide the desired detention period of material in each of the several tanks, suitable valves (not shown) being provided wherever necessary to permit the desired control. Moreover, it will be understood that where necessary suitable pumping means (not shown) may be provided for passing material from one tank to the other.

The major portion or main flow of waste liquor passing through the pipe 12 is delivered to a yeast growth zone which conveniently may be defined by a tank 13 of suitable capacity to provide a suitable detention period, for example, approximately 24 hours. The waste liquor in the yeast growth zone provided by tank 13 is inoculated with a suitable quantity of culture material from the yeast culture tank 10. For this purpose the system shown in Fig. 1 includes a pipe leading from the yeast culture tank 10 to the yeast growth tank 13. The waste liquor in the yeast growth zone provided by tank 13, after being inoculated as aforesaid, is allowed to ferment under anaerobic conditions for example approximately 24 hours, with resultant conversion of the sugars in the waste to alcohol, yeast (that is to say, growing cells), and $CO_2$. The $CO_2$ preferably is discharged from the tank 13 continuously as it is evolved and to this end suitable discharge means (not shown) are provided.

The yeast in the yeast growth tank is supplied with a sufficient quantity of nitrogenous food, and other necessary nutrients where not available in the waste liquor, to insure vigorous growth of the yeast, in a manner similar to that described above in connection with the yeast culture tank. Also, the acidity of the material in the yeast growth tank is maintained at approximately pH 4 by the addition where necessary of suitable materials, similarly to the manner in which the pH is adjusted in the yeast culture tank. The yeast cell count in the yeast growth tank is started and maintained at a level approximately that in the yeast culture tank in a manner similar to that above described. At the end of the fermentation period substantially all of the sugar content of the waste has been converted to alcohol, $CO_2$ and yeast cells under ordinary circumstances.

The waste liquor, after having been subjected to yeast fermentation as just described, is then subjected to anaerobic digestion according to reactions well known in the art of sewage and other organic wastes treatment. This digestion is effected by maintaining the material to be digested in a suitable digestion zone such as may be provided by a conventional digester 15. The digester 15 is suitably connected as by a pipe 16 to the yeast growth tank 13 for receiving fermented waste liquor therefrom. The waste liquor which has been passed into the digester 15 is inoculated or seeded with suitable organisms capable of effecting anaerobic digestion of the waste liquor and conversion to the usual products of anaerobic digestion, including principally digested solids, methane and carbon dioxide. Suitable means of a known type (not shown) are provided for withdrawing and for collecting the gases evolved.

The waste liquor is preferably detained in the digestion zone for a period of twice the period of detention in the yeast growth zone and in the preferred case such period is approximately two days. The waste liquor having been purified to a substantial extent in the digestion zone is suitable in many cases for disposal in customary ways as, for example, discharge into natural drainage channels. In such case the sludge is discharged to a point of disposal or other utilization through a suitable discharge outlet 24 and the effluent is similarly discharged through an effluent discharge such as a pipe 17.

It is generally preferable, however, to subject the fermented waste liquors to a secondary anaerobic digestion as is common in many sewage and waste disposal systems. To this end a secondary digestion zone is provided which ordinarily has a detention period of approximately one-half that of the primary digestion zone, or preferably one day's time. The secondary digestion zone preferably is provided by an anaerobic digester 18 having a sludge discharge outlet 19 and an effluent discharge outlet 20. Suitable means, including piping 29, is provided for recycling effluent from the secondary digestion tank to the primary digestion tank for volatile acids control in accordance with known practices in the sewage treatment field. In those cases where the product of the anaerobic digestion is not suitable for disposal by discharge in the natural drainage channels it may be further treated by conventional processes such as those commonly employed in the further treatment of the products of anaerobic digestion of sewage and other organic wastes.

It is important that there be no back circulation of bacteria from the digester 15 to the yeast growth tank 13 or from the latter to the yeast culture tank 10 in order to insure that there will be no contamination of the earlier steps in the fermentation. Accordingly, the over-flow line from the yeast culture tnak 10 enters the yeast growth tank 13 well above the liquid level therein and the over-flow line 16 from the yeast growth tank 13 enters the digester 15 well above the liquid level therein.

In certain cases, as for example where the waste liquid contains a relatively high concentration of sugars, it may be found desirable to effect a two-stage yeast fermentation of the waste liquors. Under these conditions a system generally similar to that described above and illustrated diagrammatically in Fig. 1 may be employed, with the addition, however, of means for defining a secondary yeast growth zone. Preferably the secondary yeast growth zone provides a detention period approximately equal to that of the primary yeast growth zone, the waste liquors being passed successively through the primary and secondary yeast growth zones and from the latter to the primary digestion zone. The system for carrying out the process employing two yeast growth zones may be similar to that illustrated in Fig. 1 but includes a secondary growth tank 25 (Fig. 2) connected between the primary yeast growth tank 13 and the primary digester 15. The tank 25 thus receives waste material through the discharge pipe 16 of the primary yeast growth tank and discharges into the primary digester 15 through a discharge pipe 26. It also is supplied with effluent from the digester tank or tanks through a pipe 28. It will be seen that the process employing a two-stage yeast growth step is generally similar to that employing a single-stage yeast growth step, except for the longer period of detention of the material for yeast fermentation.

The yeast fermentation which is carried out in the yeast growth zone (or zones, where a two-stage yeast fermentation step is employed) results in the production of certain solids of a nitrogenous nature rendering them suitable for use as a nitrogen supplement for cattle feed. Under certain economic conditions it may be advantageous to recover such solids rather than to subject them to the anaerobic digestion along with the remaining components of the liquor. Where it is economically advantageous, the solids resulting from the yeast formation are removed from the liquor by suitable means, as for example a centrifuge, a sedimentation or thickening tank, or a filter press. The recovery means, which may consist of any of the aforesaid arrangements, is connected in the system as at 30 in Fig. 3 to receive liquor from the yeast culture tank discharge pipe 16 and is connected to discharge liquor resulting from the separation operation through pipe 31 into the primary digester 15. The concentrate or cake produced by the recovery means 30 is suitably discharged therefrom as indicated at 32. The recovery means may, of course, be employed also in a system such as that shown in Fig. 2 where a two-stage yeast growth step is employed.

It will be understood that the various tanks herein referred to, and particularly the yeast growth tanks and the digestion tanks, may be provided with suitable known means for maintaining the optimum temperature for carrying out the desired process therein. Also each tank preferably is provided with appropriate means for circulating or mixing the contents thereof in accordance with known practices in connection with fermentation tanks and anaerobic digesters.

We claim:

1. The process of treating citrus fruit wastes containing sugar which comprises inoculating the waste material with a yeast strain capable of fermenting the waste matertial to convert the sugar therein to alcohol, anaerobically fermenting the inoculated waste material for a sufficient period to convert at least a substantial portion of the sugar therein to alcohol, and then anaerobically digesting the material remaining after said yeast fermentation, including said alcohol, with methane-producing organisms such as are normally present in anaerobically digesting sewage sludge and capable of converting digestible organic material substantially completely to methane, carbon dioxide and digested solids, while controlling volatile acid production, to convert said remaining material substantially completely to digested solids, methane and carbon dioxide.

2. The process of treating citrus fruit wastes containing sugar which comprises segregating a portion of the waste material, inoculating the segregated waste material with a yeast strain capable of fermenting the waste material to convert the sugar therein to alcohol, supplying the inoculated, segregated material with nitrogenous food to produce an active culture of said yeast strain, supplying such culture material as an inoculum to the remaining waste material, anaerobically fermenting the inoculated waste material for a sufficient period to convert at least a substantial portion of the sugar therein to alcohol, and then anaerobically digesting the material remaining after said yeast fermentation, including said alcohol, with methane-producing organisms such as are normally present in anaerobically digesting sewage sludge and capable of converting digestible organic material substantially completely to methane, carbon dioxide and digested solids, while controlling volatile acid production, to convert said remaining material substantially completely to digested solids, methane and carbon dioxide.

3. The process of treating citrus fruit wastes containing sugar which comprises segregating a portion of the waste material, inoculating the segregated waste material with a yeast strain capable of fermenting the waste material to convert the sugar therein to alcohol, supplying the inoculated, segregated material with nitrogenous food to produce an active culture of said yeast strain, supplying such culture material as an inoculum to the remaining waste material, anaerobically fermenting the inoculated waste material for a sufficient period to convert at least a substantial portion of the sugar therein to alcohol, maintaining said fermenting material at a pH of between approximately 3.5 and approximately 4 and a yeast count level of between approximately 100 million and approximately 200 million per c. c., and anaerobically digesting the material remaining after said yeast fermentation, including said alcohol, with methane-producing organisms such as are normally present in anaerobically digesting sewage sludge and capable of converting digestible organic material substantially completely to methane, carbon dioxide and digested solids, while controlling volatile acid production, to convert said remaining material substantially completely to digested solids, methane and carbon dioxide.

4. The process of treating citrus fruit wastes containing sugar which comprises inoculating the waste material with a yeast strain capable of fermenting the waste material to convert the sugar therein to alcohol, anaerobically fermenting the inoculated waste material for a sufficient period to convert at least a substantial portion of the sugar therein to alcohol, removing the solids from the material remaining after said yeast fermentation, and anaerobically digesting the liquor remaining after the removal of said solids from the yeast growth products and including said alcohol, with methane-producing organisms such as are normally present in anaerobically digesting sewage sludge and capable of converting digestible organic material substantially completely to methane, carbon dioxide and digested solids, while controlling volatile acid production, to convert said liquor substantially completely to digested solids, methane and carbon dioxide.

5. The process of treating citrus fruit wastes containing sugar which comprises passing a major portion of the waste to be treated to a fermentation zone and a minor portion to a culture zone, inoculating the material in the culture zone with a yeast strain capable of converting the sugar therein to alcohol, supplying the inoculated material with nitrogenous food material and cultivating said inoculated material to produce a culture rich in yeast capable of active growth in the presence of the waste material, passing to said fermentation zone cultured material from said culture zone and containing active yeast, anaerobically fermenting the material in the fermentation zone to convert at least a substantial portion of the sugar therein to alcohol, passing fermented material from the fermentation zone to an anaerobic digestion zone, and anaerobically digesting the material in said digestion zone, including said alcohol, with methane-producing organisms such as are normally present in anaerobically digesting sewage sludge and capable of converting digestible organic material substantially completely to methane, carbon dioxide and digested solids, while controlling volatile acid production, to convert said remaining material substantially completely to digested solids, methane and carbon dioxide.

6. The process of treating citrus fruit wastes containing sugar which comprises passing a major portion of the waste to be treated to a fermentation zone and a minor portion to a culture zone, inoculating the material in the culture zone with a yeast strain capable of converting the sugar therein to alcohol, cultivating said inoculated material to produce a culture rich in yeast capable of active growth in the presence of the waste material, passing cultured material containing active yeast to said fermentation zone above the level of material therein, anaerobically fermenting the material in the fermentation zone to convert at least a substantial portion of the sugar therein to alcohol, passing fermented material from the fermentation zone to a digestion zone above the level of the material therein, and anaerobically digesting the material in said digestion zone, including said alcohol, with methane-producing organisms such as are normally present in anaerobically digesting sewage sludge and capable of converting digestible organic material substantially completely to methane, carbon dioxide and digested solids.

7. The process of treating citrus fruit wastes containing sugar which comprises inoculating the waste material with a yeast strain selected from the group consisting of A. T. C. C. No. 2338, A. T. C. C. No. 4125, A. T. C. C. No. 6038, A. T. C. C. No. 2478 and N. R. L. No. 379 and capable of fermenting the waste material to convert the sugar therein to alcohol, anaerobically fermenting the inoculated waste material for a sufficient period to convert at least a substantial portion of the sugar therein to alcohol, and then anaerobically digesting the material remaining after said yeast fermentation, including said alcohol, with methane-producing organisms such as are normally present in anaerobically digesting sewage sludge and capable of converting digestible organic material substantially completely to methane, carbon dioxide and digested solids to convert said remaining material substantially completely to digested solids, methane and carbon dioxide.

8. The process of treating citrus fruit wastes containing sugar which comprises segregating a portion of the waste material, inoculating the segregated waste material with a yeast strain capable of fermenting the waste material to convert the sugar therein to alcohol, supplying the inoculated, segregated material with nitrogenous food to produce an active culture of said yeast strain, supplying such culture material as an inoculum to the remaining waste material, anaerobically fermenting the inoculated waste material for a period of approximately 24 hours to convert at least a substantial portion of the sugar therein to alcohol, yeast and carbon dioxide and then anaerobically digesting for approximately 24 hours the material remaining after said yeast fermentation, including said alcohol, with methane-producing organisms such as are normally present in anaerobically digesting sewage sludge and capable of converting digestible organic material substantially completely to methane, carbon dioxide and digested solids, while controlling volatile acid production, to convert such remaining material substantially completely to digested solids, methane and carbon dioxide.

9. The process of treating citrus fruit wastes containing sugar which comprises passing a major portion of the waste to be treated to a fermentation zone and a minor portion to a culture zone, inoculating the material in the culture zone with a yeast strain capable of converting the sugar therein to alcohol, supplying said inoculated material with nitrogenous food, maintaining said inoculated material at between approximately pH 3.5 and approximately pH 4 and a yeast count level of between approximately 100 million and approximately 200 million per c. c. to produce an active growth of said yeast, supplying said inoculated material as an inoculum to the major portion of said waste in said fermentation zone, maintaining the material in said fermentation zone for approximately 24 hours under anaerobic conditions and at between approximately pH 3.5 and approximately pH 4 and a yeast count of between approximately 100 million and 200 million per c. c. to convert substantially all of said sugar to alcohol, carbon dioxide and yeast cells, passing the material remaining after said yeast fermentation, including said alcohol, to a digestion zone, and subjecting the material in said digestion zone to anaerobic digestion for approximately 48 hours by methane-forming organisms such as are normally present in anaerobically digesting sewage sludge and capable of converting digestible organic material substantially completely to methane, carbon dioxide and digested solids while controlling volatile acid production, to convert said remaining material substantially completely to methane, carbon dioxide and digested solids, and removing from said digestion zone effluent and digested solids.

References Cited in the file of this patent

UNITED STATES PATENTS

| Number | Name | Date |
|---|---|---|
| 1,751,459 | Simmer | Mar. 18, 1930 |
| 2,083,598 | Effront | June 15, 1937 |
| 2,122,939 | Hansen | July 5, 1938 |
| 2,371,208 | Alzola | Mar. 13, 1945 |
| 2,372,854 | Reich | Apr. 3, 1945 |
| 2,528,649 | Genter et al. | Nov. 7, 1950 |
| 2,562,510 | Schlenz | July 31, 1951 |
| 2,572,767 | Schlenz | Oct. 23, 1951 |